US012657884B2

(12) United States Patent
Qu et al.

(10) Patent No.: US 12,657,884 B2
(45) Date of Patent: Jun. 16, 2026

(54) SYSTEM AND METHOD FOR SYNTHETIC IMAGE GENERATION

(71) Applicant: Samsung Display Co., Ltd., Yongin-si (KR)

(72) Inventors: Shuhui Qu, Fremont, CA (US); Janghwan Lee, Pleasanton, CA (US)

(73) Assignee: Samsung Display Co., Ltd., Yongin-si (KR)

( * ) Notice: Subject to any disclaimer, the term of this patent is extended or adjusted under 35 U.S.C. 154(b) by 321 days.

(21) Appl. No.: 18/467,550

(22) Filed: Sep. 14, 2023

(65) Prior Publication Data

US 2024/0346806 A1    Oct. 17, 2024

Related U.S. Application Data

(60) Provisional application No. 63/458,592, filed on Apr. 11, 2023.

(51) Int. Cl.
*G06V 10/774*      (2022.01)
*G06T 11/00*       (2006.01)
*G06V 10/82*       (2022.01)

(52) U.S. Cl.
CPC ............ *G06V 10/774* (2022.01); *G06T 11/00* (2013.01); *G06V 10/82* (2022.01)

(58) Field of Classification Search
None
See application file for complete search history.

(56) References Cited

U.S. PATENT DOCUMENTS

| | | |
|---|---|---|
| 9,595,134 B2 | 3/2017 | Ramalingam et al. |
| 2020/0089965 A1* | 3/2020 | Hollander .......... G06V 10/7715 |
| 2021/0241468 A1 | 8/2021 | Zhang |
| 2023/0097133 A1 | 3/2023 | Bai et al. |

FOREIGN PATENT DOCUMENTS

KR        10-2145220 B1      8/2020

OTHER PUBLICATIONS

Martin-Brualla, R. et al., "NeRF in the Wild: Neural Radiance Fields for Unconstrained Photo Collections", arXiv:2008.02268v3, Jan. 6, 2021, pp. 1-15.
Yang, W. et al., "S³-NeRF: Neural Reflectance Field from Shading and Shadow under a Single Viewpoint", arXiv:2210.08936v1, Oct. 17, 2022, pp. 1-24.

* cited by examiner

*Primary Examiner* — Leon Flores
(74) *Attorney, Agent, or Firm* — Womble Bond Dickinson (US) LLP

(57)        ABSTRACT
A system and a method are disclosed for synthetic image generation. In some embodiments, the system includes one or more processors; and a memory storing instructions which, when executed by the one or more processors, cause performance of: receiving weather input data; receiving time input data; receiving pixel coordinates; using a light-source-modeling neural network, computing a light source model based on inputs of the weather input data and time input data; and using an image-generating system, generating an image based on the pixel coordinates and the light source model.

20 Claims, 6 Drawing Sheets

205 — Generate, using a light-source-modeling neural network, based on weather input data and time input data, a light source model 210 — Generate a pixel of an image, based on coordinates of the pixel, and the light source model 215 — Train a system for generating image pixels 220 — Feed, as input, to the system, labeled data corresponding to a pixel, with a label, of a training image.

SYSTEM AND METHOD FOR SYNTHETIC IMAGE GENERATION

CROSS-REFERENCE TO RELATED APPLICATION

This application claims the priority benefit under 35 U.S.C. § 119(e) of U.S. Provisional Application No. 63/458,592, filed on Apr. 11, 2023, the disclosure of which is incorporated by reference in its entirety as if fully set forth herein.

TECHNICAL FIELD

The disclosure generally relates to artificial intelligence. More particularly, the subject matter disclosed herein relates to improvements to a system and method for synthetic image generation.

SUMMARY

Machine learning models such as neural networks may be used for a variety of applications, including, for example, classifying the images as either being normal or anomalous. Such an image classification system may be useful, for example, for monitoring surveillance video and raising an alarm if an anomaly (e.g., a fire, or a break-in) is detected.

To employ a machine learning system in such an application, it may be advantageous to train the machine learning system with training data including normal images and anomalous images.

One issue with the above approach is that although normal images suitable for use as training data may be readily available, anomalous images may be difficult to obtain, especially in the quantity and variety that may be useful for training.

To overcome these issues, systems and methods are described herein for synthetically generating training data, including normal images and anomalous images.

The above approaches improve on previous methods because they address the scarcity of anomalous training images, and also provide a potentially useful supply of normal training images.

According to an embodiment of the present disclosure, there is provided a system including: one or more processors; a memory storing instructions which, when executed by the one or more processors, cause performance of: receiving weather input data; receiving time input data; receiving pixel coordinates; using a light-source-modeling neural network, computing a light source model based on inputs of the weather input data and time input data; and using an image-generating system, generating an image based on the pixel coordinates and the light source model.

In some embodiments, the image-generating system includes: a density-modeling neural network, using as input a set of ray sample points based on the pixel coordinates and the light source model; a color-modeling neural network using as input the set of ray sample points based on the pixel coordinates and the light source model; and an occupancy-modeling neural network using as input the set of ray sample points based on the pixel coordinates.

In some embodiments, the instructions, when executed by the one or more processors, further cause performance of generating a pixel value based on output of: the density-modeling neural network; the color-modeling neural network; and the occupancy-modeling neural network.

In some embodiments, the image-generating system further includes a transient-modeling neural network using temporal data as input.

In some embodiments, the instructions, when executed by the one or more processors, further cause performance of generating a pixel value based on output of the transient-modeling neural network.

In some embodiments: the density-modeling neural network further uses as input the time input data and the weather input data; and the color-modeling neural network further uses as input the time input data and the weather input data.

In some embodiments, the instructions, when executed by the one or more processors, further cause performance of generating a pixel value based on output of: the density-modeling neural network; the color-modeling neural network; and the occupancy-modeling neural network.

In some embodiments, the image-generating system further includes a transient-modeling neural network using temporal data as input.

In some embodiments, the instructions, when executed by the one or more processors, further cause performance of generating a pixel value based on output of the transient-modeling neural network.

In some embodiments, the instructions, when executed by the one or more processors, further cause performance of receiving anomaly indicator data.

In some embodiments, the image-generating system includes: a density-modeling neural network, using as input a set of ray sample points based on the pixel coordinates and the light source model; a color-modeling neural network using as input the set of ray sample points based on the pixel coordinates and the light source model; and an occupancy-modeling neural network using as input the set of ray sample points based on the pixel coordinates.

In some embodiments, the instructions, when executed by the one or more processors, further cause performance of generating a pixel value based on output of: the density-modeling neural network; the color-modeling neural network; and the occupancy-modeling neural network.

In some embodiments, the image-generating system further includes a transient-modeling neural network using temporal data as input.

In some embodiments, the instructions, when executed by the one or more processors, further cause performance of generating a pixel value based on output of the transient-modeling neural network.

According to an embodiment of the present disclosure, there is provided a method, including: generating, using a light-source-modeling neural network, based on weather input data and time input data, a light source model; and generating a pixel of an image, based on: coordinates of the pixel, and the light source model.

In some embodiments, the generating of the pixel of the image includes generating the pixel of the image further based on: the weather input data, and the time input data.

In some embodiments, the generating of the pixel of the image includes generating the pixel of the image further based on anomaly indicator data.

In some embodiments, the generating of the pixel of the image includes generating the pixel of the image further based on: the weather input data, and the time input data.

In some embodiments, the method further includes training a system for generating image pixels, the training including: feeding, as input, to the system, labeled data corresponding to a pixel, with a label, of a training image, the labeled data including: time input data, weather input data, and coordinates of the pixel; and the label including intensities of the pixel, in three different colors.

According to an embodiment of the present disclosure, there is provided a system including: one or more processors; and a memory storing instructions which, when executed by the one or more processors, cause performance of: generating, using a light-source-modeling neural network, based on weather input data and time input data, a light source model; and generating a pixel of an image, based on: coordinates of the pixel, and the light source model.

BRIEF DESCRIPTION OF THE DRAWINGS

In the following section, the aspects of the subject matter disclosed herein will be described with reference to exemplary embodiments illustrated in the figures, in which.

DETAILED DESCRIPTION

Figure 1A:
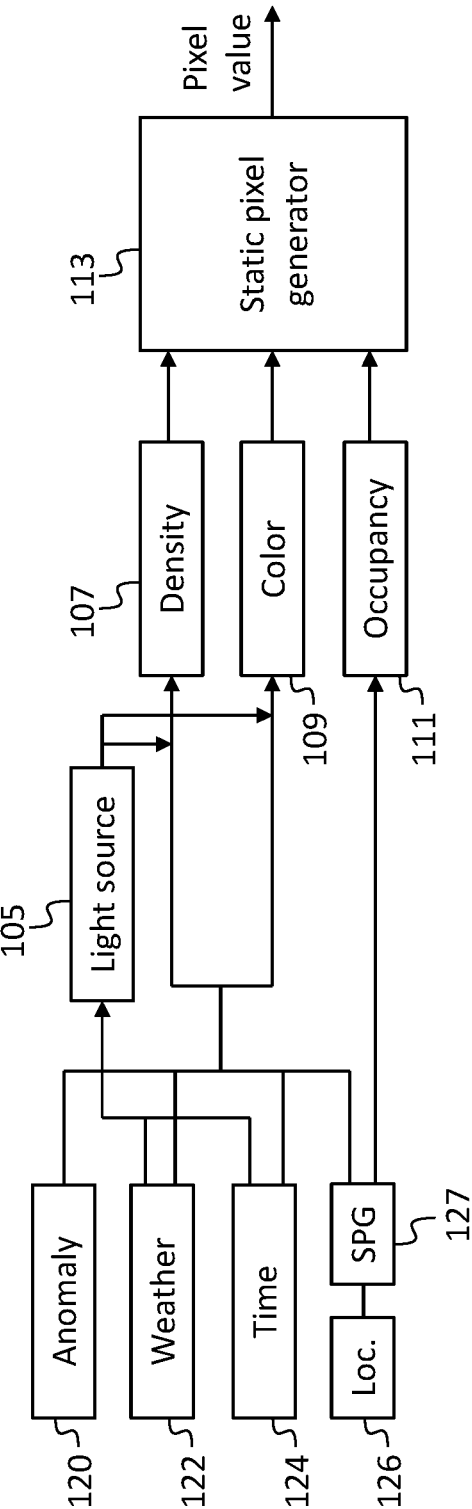
FIG. 1A is block diagram of a system for synthetic image generation, according to an embodiment.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items. As used herein, the term "or" should be interpreted as "and/or", such that, for example, "A or B" means any one of "A" or "B" or "A and B".

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firm-ware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

Various types of facilities, such as manufacturing facilities, may be monitored with (e.g., hundreds or thousands of) surveillance cameras (or "closed-circuit television cameras" (CCTV cameras)) for production and infrastructure safety. Human-based closed-circuit television anomaly detection may be tedious and time-consuming, and, as such, costly, due to the ubiquitous use of surveillance cameras and explosive growth of video data. Intelligent closed-circuit television powered with artificial intelligence (AI) technology may be used, therefore, in an attempt to reduce manual surveillance through automatic anomaly detection. A machine learning system used to analyze such images (e.g., frames of surveillance video) may be referred to as an "image-classification system" (which classifies images as either normal or anomalous).

However, as mentioned above, in some circumstances, in some cases, video data showing abnormal (or anomalous) behavior is significantly less prevalent than normal data. This may be an obstacle when training a machine learning system, because the training of an anomaly detection method may use a balanced distribution of normal and abnormal data samples. Moreover, for similar reasons, it may be difficult to obtain images of a specific abnormal behavior in different types of situations and conditions, e.g., in different weather conditions, or lighting conditions. The ability to modify and generate images of a situation of interest (e.g., an anomalous situation) under various circumstances may greatly improve the versatility and richness of data under various conditions.

In some installations, closed-circuit television data is captured at a fixed location, and with a fixed camera angle. The closed-circuit television data may be collected under different weather conditions including, for example: snow, sunny weather, cloudy weather, or rain. The light that illuminates the scene imaged by the closed-circuit television camera may originate from different sources such as street lights, sun, or reflections. As such, the time of day and the season during which closed-circuit television data is collected may influence the images captured by the closed-circuit television camera.

A variety of Artificial Intelligence Generated Content (AIGC) methods may be employed to generate images or frames of video. However, some such approaches require the observation of objects from different views, positions and angles, to be able to generate images for various light source conditions. The shadows of buildings, structures, trees, or pipes may be challenging to generate from single-view images (such as those produced by some closed-circuit television cameras), because such images may lack relatively explicit clues regarding the three-dimensional shapes of objects in the scene, clues which may be present in other systems in which images of the objects in the scene from various different camera angles are available.

As such, a system and method for image (or frame) generation is disclosed herein. Some embodiments are capable (as discussed in further detail below) of generating realistic closed-circuit television frames across various weather conditions for both normal and anomalous circumstances, and are capable of simulating surveillance camera footage under different weather conditions such as rain, snow, fog, or sunlight. Such images may be employed to facilitate the training and evaluation of closed-circuit television systems using artificial intelligence, which may be able to perform anomaly detection across various weather conditions. Some embodiments increase the number of data samples to improve the accuracy and robustness of these systems and enable them to perform better in real-world conditions.

FIG. 1A is a block diagram of a system for image generation (or "image-generation system"), in some embodiments. The system includes four neural networks, including a light-source-modeling neural network 105, a density-modeling neural network 107, a color-modeling neural network 109, and an occupancy-modeling neural network 111. The system further includes a static pixel generator 113. The system has four inputs, including an anomaly input 120, a weather input 122, a time input 124, and a location ("Loc.") input 126.

In operation (e.g., when performing inference, e.g., synthesized image generation) the inputs of the system may be fed with respective input values, and the neural network may produce a pixel. For example, to produce a first pixel of a synthesized image of a scene at noon on a sunny day, with no anomaly, the anomaly input 120 may be fed anomaly indicator data that is a value indicating that no anomaly is present, the weather input 122 may be fed a value indicating that the weather is sunny, the time input 124 may be fed an input indicating that the time is noon, and the location input 126 may be fed the coordinates (e.g., the x and y coordinates) of the pixel to be generated. This process may be repeated for each pixel in the image, using the same input values except the pixel coordinates, to generate the complete image.

The inputs may be in various forms. For example, the anomaly input 120 may be a Boolean value (e.g., taking a value of one to indicate that an anomaly is present and a value of zero to indicate that no anomaly is present). The weather input 122 may take an integer value, with, e.g., a value of one representing sunny weather, a value of two representing snow, a value of three representing rain, and a value of four representing fog. In another embodiment the weather input 122 may take as input a "one-hot" vector (a vector having elements all of which are equal to zero except one element which is equal to one), with, e.g., a one in the first position representing sunny weather, a one in the second position representing snow, a one in the third position representing rain, and a one in the fourth position representing fog. The time input 124 may similarly take as input a one-hot vector, e.g., a 24-element vector having a one at a position corresponding to the hour (in 24-hour time format). In some embodiments, the time input also includes information (e.g., an additional integer or an additional one-hot vector) indicating the time of year (e.g., the month, or a number indicating the number of days that have elapsed since January first of the current year). The location input 126 may take as input a first integer representing the x coordinate of the pixel in the image and a second integer representing the y coordinate of the pixel in the image. In some embodiments, the location input 126 takes a third integer, representing a z coordinate, which may be set to zero. Each pixel in the image may correspond to a pixel of the detector (e.g., of the camera), and the pixel of the detector may correspond (e.g., by ray tracing through the optical system of the detector) to a ray in the scene. This ray may be sampled (e.g., at regular intervals), by a sample point generator (SPG) 127, to form a set of points, along the ray, referred to as "ray sample points" (each ray sample point being a point (e.g., a point having three coordinates) in three-dimensional space.

Each of the light-source-modeling neural network 105, the density-modeling neural network 107, the color-modeling neural network 109, and the occupancy-modeling neural network 111 may be a respective multi-layer perceptron (MLP). The light-source-modeling neural network 105 may be connected to the weather and time inputs as shown, and it may be configured (e.g., connected and trained) to generate a light source model (e.g., as a latent vector) that contains a representation of the characteristics of the light (e.g., sunlight, diffuse light from clouds, artificial light, or reflections) illuminating the scene.

The density-modeling neural network 107 may receive as input values from each of the anomaly input 120, the weather input 122, the time input 124, the location input 126, and the output of the light-source-modeling neural network 105, and it may be configured (e.g., connected and trained) to generate a density function. The color-modeling neural network 109 may receive as input values from each of the anomaly input 120, the weather input 122, the time input 124, the location input 126, and the output of the light-source-modeling neural network 105, and it may be configured (e.g., connected and trained) to generate a color rendering function. The occupancy-modeling neural network 111 may receive as input the value from the location input 126, and it may generate an occupancy function.

The outputs of the density-modeling neural network 107, the color-modeling neural network 109, and the occupancy-modeling neural network 111 may be fed to the static pixel generator 113, which may generate a pixel value, represented, for example, as a three-element vector representing the intensity of three colors (e.g., red, green and blue) at the pixel. The static pixel generator 113 may generate the pixel value using the following equation:

$$C(r) = R(r, c, \sigma) = \sum_{i=1}^{Nv} O(x_i) \prod_{j<i} (1 - O(x_j)) f_\sigma(p_l, x_i, w, t) f_c(p_l, x_i, w, t)$$

where
c is the color rendering,
C is the final approximated pixel,
r is a ray,
$x_j$ is a point sample along the ray,
Nv is the number samples in the ray,
$\sigma$ is a density,
O is the occupancy function,
$x_i$ is the location of the pixel,
$f_\sigma$ is the density function,
$f_c$ is the color rendering function,
w is the weather embedding,
t is the time embedding, and
$p_l$ is the light source embedding.

Figure 1B:
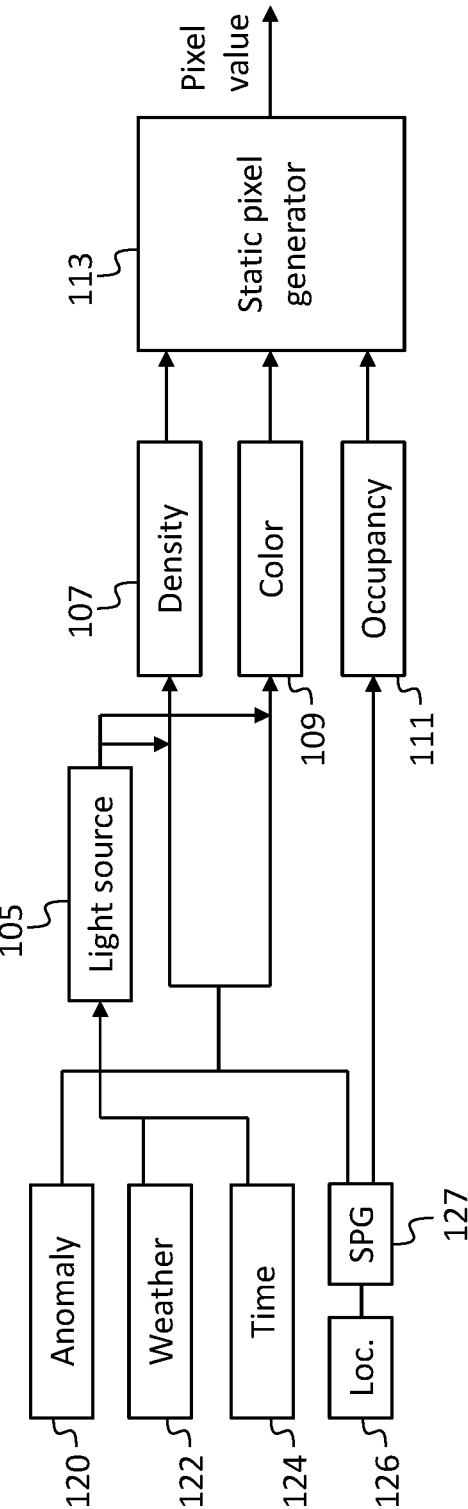
FIG. 1B is block diagram of a system for synthetic image generation, according to an embodiment.

Referring to FIG. 1B, in some embodiments the weather input 122 and the time input 124 are not connected directly to the density-modeling neural network 107 and the color-modeling neural network 109, but are directly connected only to the light-source-modeling neural network 105. In such an embodiment, information regarding the time and the weather may nonetheless affect the outputs generated by the density-modeling neural network 107 and the color-modeling neural network 109, by affecting the output of the light-source-modeling neural network 105, which is fed to the density-modeling neural network 107 and the color-modeling neural network 109.

Training of the system of FIG. 1A and of the system of FIG. 1B may be performed as follows, using a training data set including a plurality of normal images and a plurality of anomalous images, each of which may be labelled with a value for each of the anomaly, weather, and time. Each image may be converted into a plurality of training data points, each of which is a pixel of the training image labeled with the red, green, and blue intensities of the pixel. The input values of each of these training data points may be the anomaly, weather, and time of the training image from which the pixel is taken, and the coordinates of the pixel within that image.

The loss function used for training may be calculated as follows. A sigma rendering loss $L_\sigma$ may be defined as follows:

$$L_\sigma = \Sigma \|C - I\|_1$$

where I is the value (i.e., the label) of the pixel.
A surface rendering loss $L_s$ may be defined as follows:

$$C_s(r) = R(r, c, \sigma) = f_\sigma(p_l, x_i, w, t) f_c(p_l, x_i, w, t)$$

$$L_s = \sum \|C_s - I\|_1$$

These loss functions may be summed to form the total loss function.

In operation, transient phenomena, such as moving objects, illumination, or image auto-balancing issues may degrade the performance of an image-classification system. For example, if an insect flies through the field of view of the camera, the image-classification system may identify the resulting images as differing significantly from normal images and it may therefore classify such images as anomalous. As such, in some embodiments, the image-generation system is constructed to generate images including a random component, so that a training method that uses images produced by the image-generation system to train an image-classification system may produce an image-classification system with a reduced vulnerability to transient phenomena.

Figure 1C:
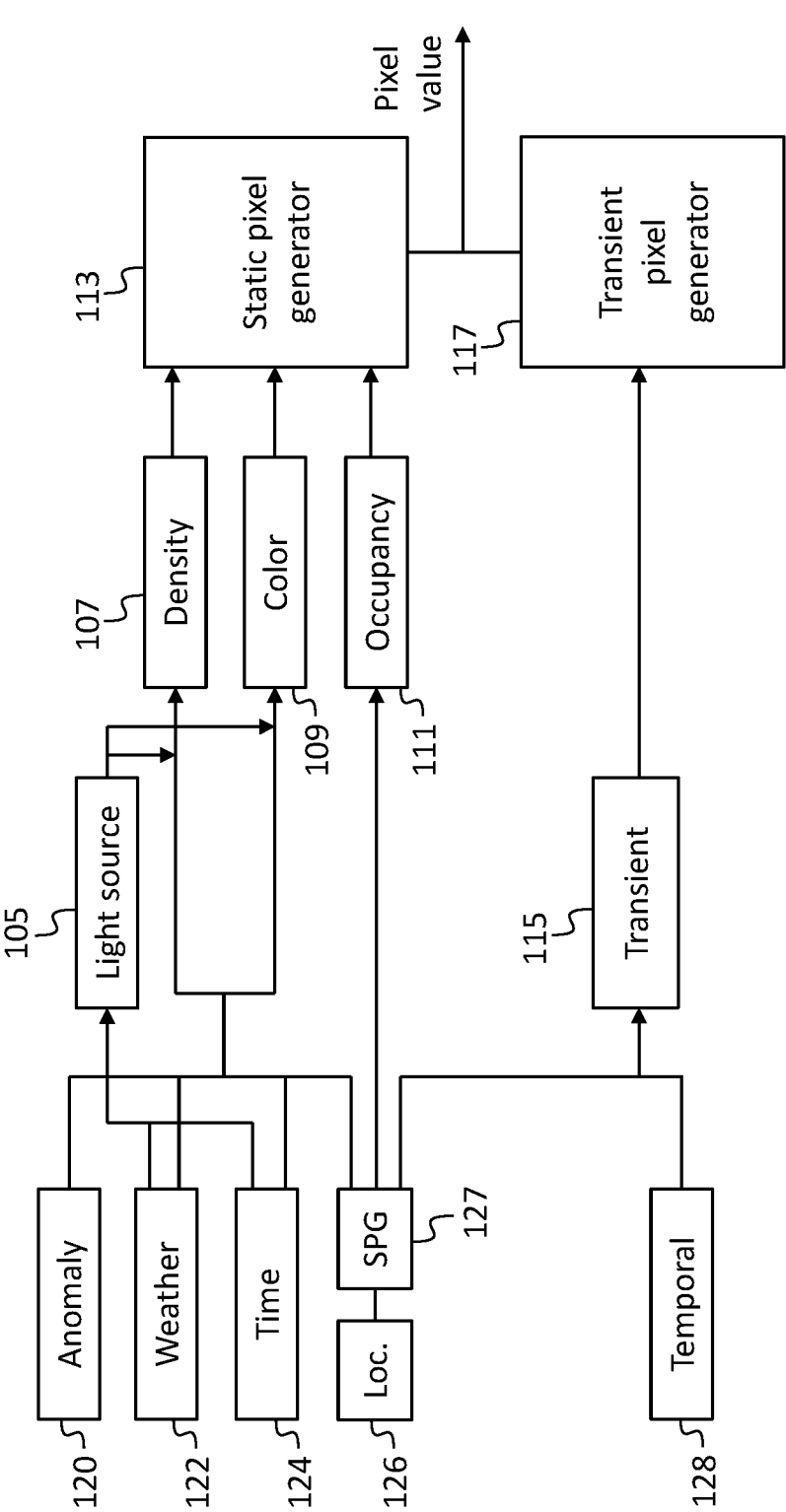
FIG. 1C is block diagram of a system for synthetic image generation, according to an embodiment.

FIG. 1C shows such an image-generation system. The system of FIG. 1C has a temporal input 128 for receiving temporal data and includes a transient-modeling neural network 115. In operation, the transient-modeling neural network 115 receives (i) a set of ray sample points from the sample point generator 127, based on the pixel coordinates from the location input 126, and temporal data from the temporal input 128, and generates, as output, a density function and a color rendering function. The system of FIG. 1C further includes a second pixel generator, which may be referred to as a "transient pixel generator" 117, which uses as input the output of the transient-modeling neural network 115, and generates a pixel value, represented, for example, as a three-element vector representing the intensity of three colors (e.g., red, green and blue) at the pixel.

The transient pixel generator 117 may generate the pixel value using the following equation:

$$\hat{C}(r) = R(r, c, \sigma) =$$

-continued $$\sum_{i=1}^{N_v} O(x_i) \prod_{j<i} (1 - O(x_j))(f_\sigma(p_l, x_i, w, t) f_c(p_l, x_i, w, t) + \overline{f_\sigma}(x_i) \overline{f_c}(x_i)),$$

where $\overline{f_\sigma}(x_i)$ and $\overline{f_c}(x_i)$ are the transient density function and the transient color function, respectively.

Figure 1D:
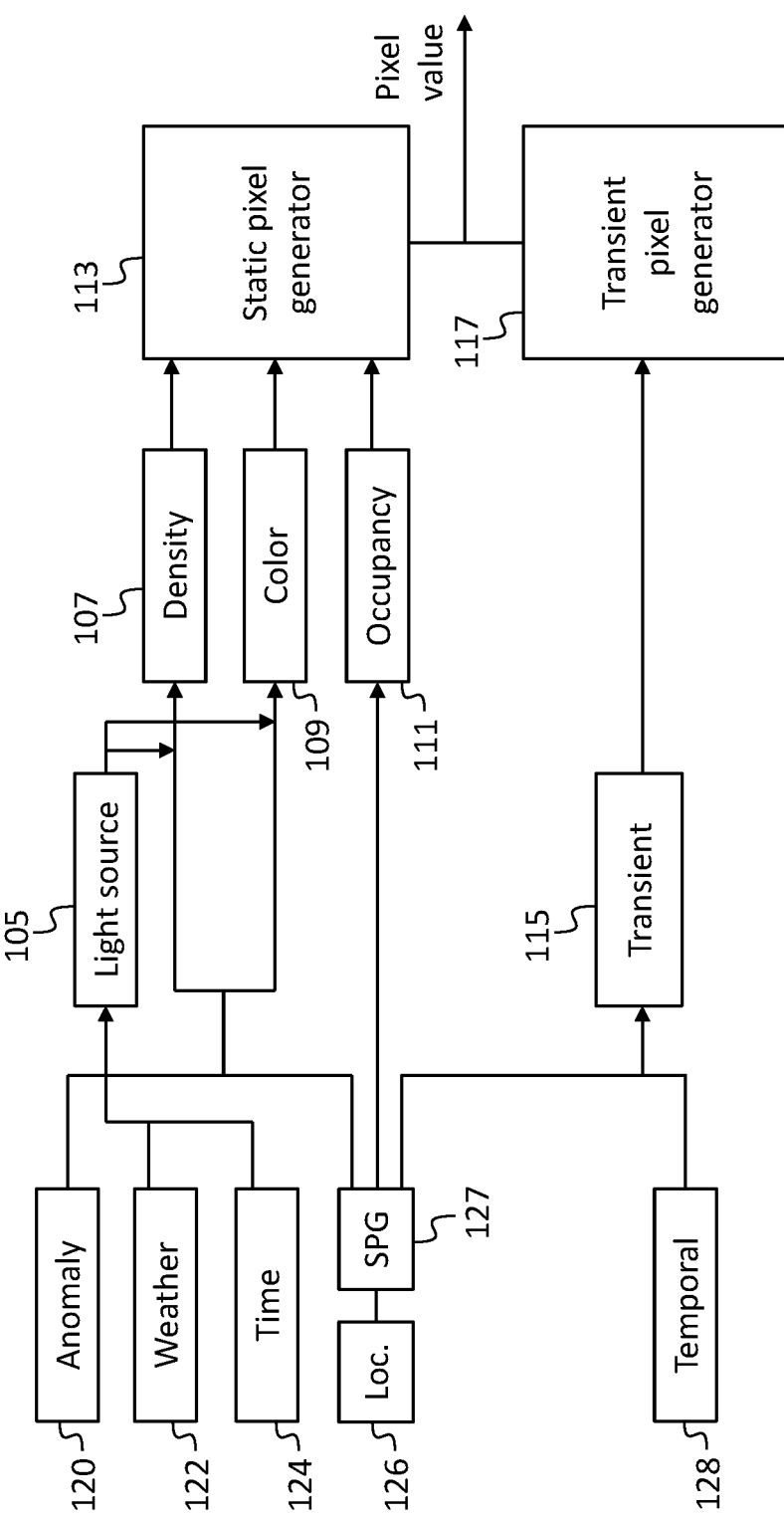
FIG. 1D is block diagram of a system for synthetic image generation, according to an embodiment.

During both training and inference, vectors of Gaussian-distributed pseudorandom numbers may be fed into the temporal input 128. FIG. 1D shows a system that is the result of adding, to the system of FIG. 1B, the transient-modeling features of FIG. 1C. The combination of elements shown in any one of FIGS. 1A-1D, excluding the light-source-modeling neural network 105, may be referred to as an "image-generating system".

To train a system such as that of FIG. 1C or FIG. 1D, the loss function may be modified to include a third term, so that the total loss function is $$L = L_\sigma + L_s + \frac{1}{2}\|C - \hat{C}\|_2^2.$$

Figure 2:
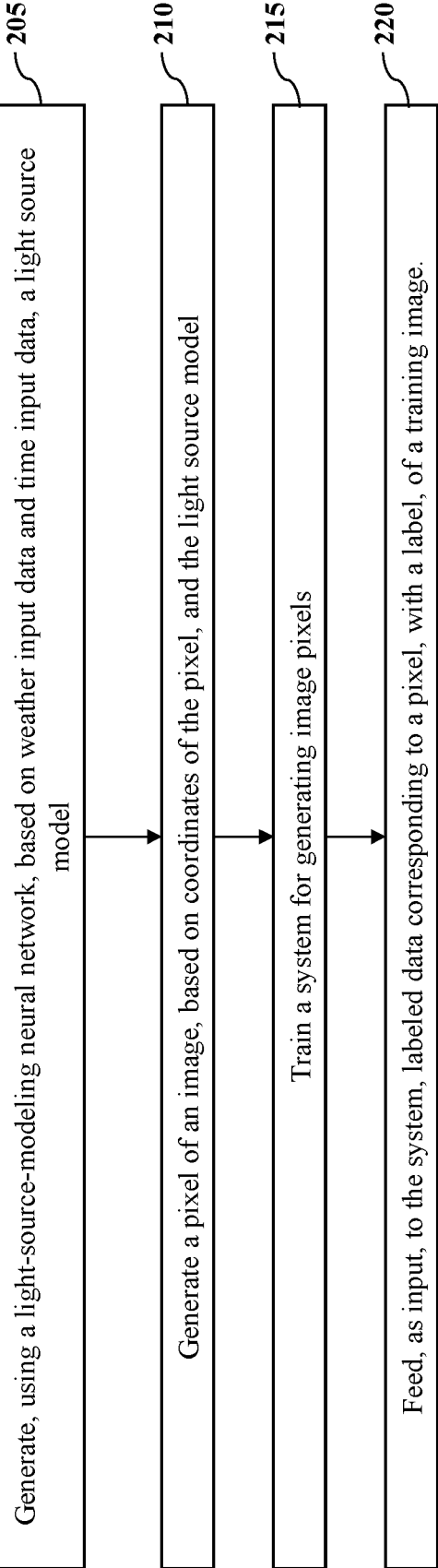
FIG. 2 is a flowchart of a method, according to an embodiment.

FIG. 2 is a flow chart of a method, in some embodiments. The method includes, generating, at 205, using a light-source-modeling neural network, based on weather input data and time input data, a light source model; and generating, at 210, a pixel of an image, based on: coordinates of the pixel, and the light source model. In some embodiments, the generating of the pixel of the image includes generating the pixel of the image further based on: the weather input data, and the time input data. In some embodiments, the generating of the pixel of the image includes generating the pixel of the image further based on anomaly indicator data. In some embodiments, the generating of the pixel of the image includes generating the pixel of the image further based on: the weather input data, and the time input data. In some embodiments, the method further includes training, at 215, a system for generating image pixels. The training may include, at 220: feeding, as input, to the system, labeled data corresponding to a pixel, with a label, of a training image, the labeled data including: time input data, weather input data, and coordinates of the pixel; and the label including intensities of the pixel, in three different colors.

Figure 3:
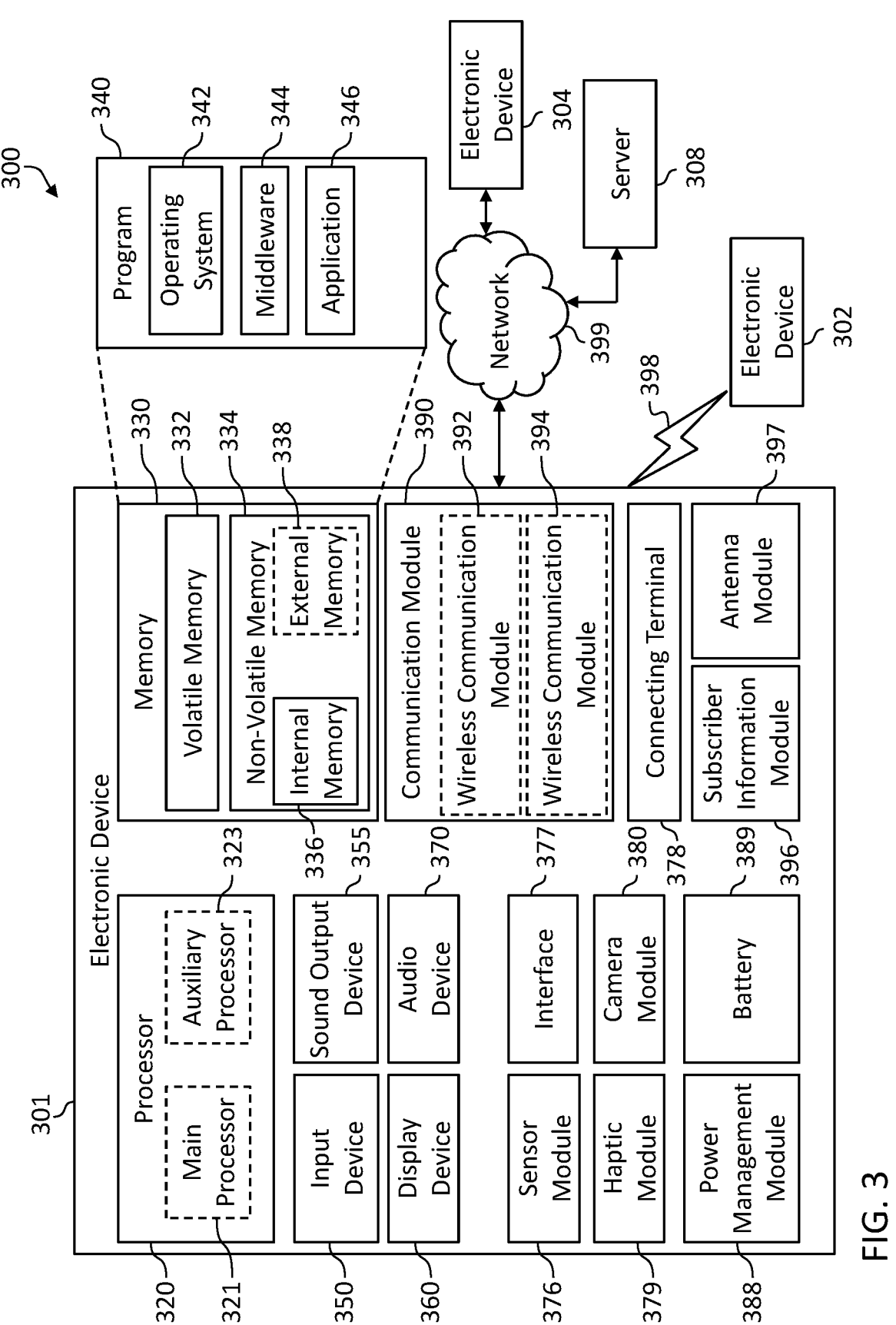
FIG. 3 is a block diagram of an electronic device in a network environment, according to an embodiment.

FIG. 3 is a block diagram of an electronic device 301 in a network environment 300, according to an embodiment. The electronic device may be used to implement, for example, an image-generation system according to embodiments disclosed herein, for training, or for inference, or for both, or to implement an image-classification system as described herein.

Referring to FIG. 3, an electronic device 301 in a network environment 300 may communicate with an electronic device 302 via a first network 398 (e.g., a short-range wireless communication network), or an electronic device 304 or a server 308 via a second network 399 (e.g., a long-range wireless communication network). The electronic device 301 may communicate with the electronic device 304 via the server 308. The electronic device 301 may include a processor 320, a memory 330, an input device 340, a sound output device 355, a display device 360, an audio module 370, a sensor module 376, an interface 377, a haptic module 379, a camera module 380, a power management module 388, a battery 389, a communication module 390, a subscriber identification module (SIM) card 396, or an antenna module 394. In one embodiment, at least one (e.g., the display device 360 or the camera module 380) of the components may be omitted from the electronic device 301, or one or more other components may be added to the electronic device 301. Some of the components may be implemented as a single integrated circuit (IC). For example, the sensor module 376 (e.g., a fingerprint sensor, an iris sensor, or an illuminance sensor) may be embedded in the display device 360 (e.g., a display).

The processor 320 may execute software (e.g., a program 340) to control at least one other component (e.g., a hardware or a software component) of the electronic device 301 coupled with the processor 320 and may perform various data processing or computations.

As at least part of the data processing or computations, the processor 320 may load a command or data received from another component (e.g., the sensor module 346 or the communication module 390) in volatile memory 332, process the command or the data stored in the volatile memory 332, and store resulting data in non-volatile memory 334. The processor 320 may include a main processor 321 (e.g., a central processing unit (CPU) or an application processor (AP)), and an auxiliary processor 323 (e.g., a graphics processing unit (GPU), an image signal processor (ISP), a sensor hub processor, or a communication processor (CP)) that is operable independently from, or in conjunction with, the main processor 321. Additionally or alternatively, the auxiliary processor 323 may be adapted to consume less power than the main processor 321, or execute a particular function. The auxiliary processor 323 may be implemented as being separate from, or a part of, the main processor 321.

The auxiliary processor 323 may control at least some of the functions or states related to at least one component (e.g., the display device 360, the sensor module 376, or the communication module 390) among the components of the electronic device 301, instead of the main processor 321 while the main processor 321 is in an inactive (e.g., sleep) state, or together with the main processor 321 while the main processor 321 is in an active state (e.g., executing an application). The auxiliary processor 323 (e.g., an image signal processor or a communication processor) may be implemented as part of another component (e.g., the camera module 380 or the communication module 390) functionally related to the auxiliary processor 323.

The memory 330 may store various data used by at least one component (e.g., the processor 320 or the sensor module 376) of the electronic device 301. The various data may include, for example, software (e.g., the program 340) and input data or output data for a command related thereto. The memory 330 may include the volatile memory 332 or the non-volatile memory 334.

The program 340 may be stored in the memory 330 as software, and may include, for example, an operating system (OS) 342, middleware 344, or an application 346.

The input device 350 may receive a command or data to be used by another component (e.g., the processor 320) of the electronic device 301, from the outside (e.g., a user) of the electronic device 301. The input device 350 may include, for example, a microphone, a mouse, or a keyboard.

The sound output device 355 may output sound signals to the outside of the electronic device 301. The sound output device 355 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 360 may visually provide information to the outside (e.g., a user) of the electronic device 301. The display device 360 may include, for example, a display, a hologram device, or a projector and control circuitry to control a corresponding one of the display, hologram device, and projector. The display device 360 may include touch circuitry adapted to detect a touch, or sensor circuitry (e.g., a pressure sensor) adapted to measure the intensity of force incurred by the touch.

The audio module 370 may convert a sound into an electrical signal and vice versa. The audio module 370 may obtain the sound via the input device 350 or output the sound via the sound output device 355 or a headphone of an external electronic device 302 directly (e.g., wired) or wirelessly coupled with the electronic device 301.

The sensor module 376 may detect an operational state (e.g., power or temperature) of the electronic device 301 or an environmental state (e.g., a state of a user) external to the electronic device 301, and then generate an electrical signal or data value corresponding to the detected state. The sensor module 376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 377 may support one or more specified protocols to be used for the electronic device 301 to be coupled with the external electronic device 302 directly (e.g., wired) or wirelessly. The interface 377 may include, for example, a high-definition multimedia interface (HDMI), a universal serial bus (USB) interface, a secure digital (SD) card interface, or an audio interface.

A connecting terminal 378 may include a connector via which the electronic device 301 may be physically connected with the external electronic device 302. The connecting terminal 378 may include, for example, an HDMI connector, a USB connector, an SD card connector, or an audio connector (e.g., a headphone connector).

The haptic module 379 may convert an electrical signal into a mechanical stimulus (e.g., a vibration or a movement) or an electrical stimulus which may be recognized by a user via tactile sensation or kinesthetic sensation. The haptic module 379 may include, for example, a motor, a piezoelectric element, or an electrical stimulator.

The camera module 380 may capture a still image or moving images. The camera module 380 may include one or more lenses, image sensors, image signal processors, or flashes. The power management module 388 may manage power supplied to the electronic device 301. The power management module 388 may be implemented as at least part of, for example, a power management integrated circuit (PMIC).

The battery 389 may supply power to at least one component of the electronic device 301. The battery 389 may include, for example, a primary cell which is not rechargeable, a secondary cell which is rechargeable, or a fuel cell.

The communication module 390 may support establishing a direct (e.g., wired) communication channel or a wireless communication channel between the electronic device 301 and the external electronic device (e.g., the electronic device 302, the electronic device 304, or the server 308) and performing communication via the established communication channel. The communication module 390 may include one or more communication processors that are operable independently from the processor 320 (e.g., the AP) and supports a direct (e.g., wired) communication or a wireless communication. The communication module 390 may include a wireless communication module 392 (e.g., a cellular communication module, a short-range wireless communication module, or a global navigation satellite system (GNSS) communication module) or a wired communication module 394 (e.g., a local area network (LAN) communication module or a power line communication (PLC) module). A corresponding one of these communication modules may communicate with the external electronic device via the first network 398 (e.g., a short-range communication network, such as Bluetooth™, wireless-fidelity (Wi-Fi) direct, or a standard of the Infrared Data Association (IrDA)) or the second network 399 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 392 may identify and authenticate the electronic device 301 in a communication network, such as the first network 398 or the second network 399, using subscriber information (e.g., international mobile subscriber identity (IMSI)) stored in the subscriber identification module 396.

The antenna module 397 may transmit or receive a signal or power to or from the outside (e.g., the external electronic device) of the electronic device 301. The antenna module 397 may include one or more antennas, and, therefrom, at least one antenna appropriate for a communication scheme used in the communication network, such as the first network 398 or the second network 399, may be selected, for example, by the communication module 390 (e.g., the wireless communication module 392). The signal or the power may then be transmitted or received between the communication module 390 and the external electronic device via the selected at least one antenna.

Commands or data may be transmitted or received between the electronic device 301 and the external electronic device 304 via the server 308 coupled with the second network 399. Each of the electronic devices 302 and 304 may be a device of a same type as, or a different type, from the electronic device 301. All or some of operations to be executed at the electronic device 301 may be executed at one or more of the external electronic devices 302, 304, or 308. For example, if the electronic device 301 should perform a function or a service automatically, or in response to a request from a user or another device, the electronic device 301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 301. The electronic device 301 may provide the outcome, with or without further processing of the outcome, as at least part of a reply to the request. To that end, a cloud computing, distributed computing, or client-server computing technology may be used, for example.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. An apparatus, comprising: one or more processors; and a memory storing instructions which, when executed by the one or more processors, cause performance of: receiving weather input data; receiving time input data; receiving pixel coordinates; using a light-source-modeling neural network, computing a light source model based on inputs of the weather input data and time input data, the light source model containing a representation of the characteristics of light illuminating a scene; and using an image-generating system, generating an image of the scene based on the pixel coordinates and the light source model, wherein the image-generating system comprises: a density-modeling neural network, using as input a set of ray sample points based on the pixel coordinates and the light source model; and a color-modeling neural network using as input the set of ray sample points based on the pixel coordinates and the light source model.

2. The apparatus of claim 1, wherein the image-generating system comprises: an occupancy-modeling neural network using as input the set of ray sample points based on the pixel coordinates.

3. The apparatus of claim 2, wherein the instructions, when executed by the one or more processors, further cause performance of generating a pixel value based on output of:
    the density-modeling neural network;
    the color-modeling neural network; and
    the occupancy-modeling neural network.

4. The apparatus of claim 2, wherein the image-generating system further comprises a transient-modeling neural network using temporal data as input.

5. The apparatus of claim 4, wherein the instructions, when executed by the one or more processors, further cause performance of generating a pixel value based on output of the transient-modeling neural network.

6. The apparatus of claim 2, wherein:
    the density-modeling neural network further uses as input the time input data and the weather input data; and
    the color-modeling neural network further uses as input the time input data and the weather input data.

7. The apparatus of claim 6, wherein the instructions, when executed by the one or more processors, further cause performance of generating a pixel value based on output of:
    the density-modeling neural network;
    the color-modeling neural network; and
    the occupancy-modeling neural network.

8. The apparatus of claim 6, wherein the image-generating system further comprises a transient-modeling neural network using temporal data as input.

9. The apparatus of claim 8, wherein the instructions, when executed by the one or more processors, further cause performance of generating a pixel value based on output of the transient-modeling neural network.

10. The apparatus of claim 1, wherein the instructions, when executed by the one or more processors, further cause performance of receiving anomaly indicator data.

11. The apparatus of claim 10, wherein the image-generating system comprises:
    a density-modeling neural network, using as input a set of ray sample points based on the pixel coordinates and the light source model;
    a color-modeling neural network using as input the set of ray sample points based on the pixel coordinates and the light source model; and an occupancy-modeling neural network using as input the set of ray sample points based on the pixel coordinates.

12. The apparatus of claim 11, wherein the instructions, when executed by the one or more processors, further cause performance of generating a pixel value based on output of:

the density-modeling neural network;

the color-modeling neural network; and the occupancy-modeling neural network.

13. The apparatus of claim 11, wherein the image-generating system further comprises a transient-modeling neural network using temporal data as input.

14. The apparatus of claim 13, wherein the instructions, when executed by the one or more processors, further cause performance of generating a pixel value based on output of the transient-modeling neural network.

15. A method, comprising: generating, using a light-source-modeling neural network, based on weather input data and time input data, a light source model, the light source model containing a representation of the characteristics of light illuminating a scene; and generating, using an image-generating system, a pixel of an image of the scene, based on: coordinates of the pixel, and the light source model, wherein the image-generating system comprises: a density-modeling neural network, using as input a set of ray sample points based on the coordinates of the pixel and the light source model; and a color-modeling neural network using as input the set of ray sample points based on the coordinates of the pixel and the light source model.

16. The method of claim 15, wherein the generating of the pixel of the image comprises generating the pixel of the image further based on:

the weather input data, and the time input data.

17. The method of claim 15, wherein the generating of the pixel of the image comprises generating the pixel of the image further based on anomaly indicator data.

18. The method of claim 17, wherein the generating of the pixel of the image comprises generating the pixel of the image further based on:

the weather input data, and the time input data.

19. The method of claim 15, further comprising training a system for generating image pixels, the training comprising:

feeding, as input, to the system, labeled data corresponding to a pixel, with a label, of a training image, the labeled data comprising:

time input data, weather input data, and coordinates of the pixel; and the label comprising intensities of the pixel, in three different colors.

20. A system comprising: one or more processors; and a memory storing instructions which, when executed by the one or more processors, cause performance of: generating, using a light-source-modeling neural network, based on weather input data and time input data, a light source model, the light source model containing a representation of the characteristics of light illuminating a scene; and generating, using an image-generating system, a pixel of an image of the scene, based on: coordinates of the pixel, and the light source model, wherein the image-generating system comprises: a density-modeling neural network, using as input a set of ray sample points based on the coordinates of the pixel and the light source model; and a color-modeling neural network using as input the set of ray sample points based on the coordinates of the pixel and the light source model.

* * * * *